United States Patent Office 2,915,775
Patented Dec. 8, 1959

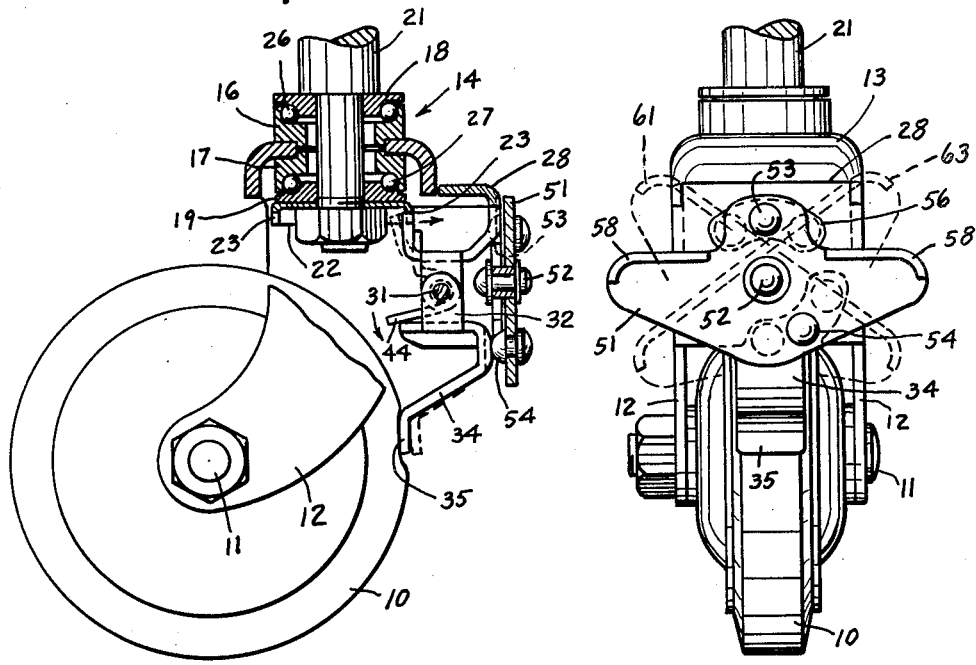

2,915,775
CASTER LOCKING ASSEMBLY

John A. Skupas, Evansville, Ind., assignor to Faultless Caster Corporation, Evansville, Ind., a corporation Application March 25, 1957, Serial No. 648,331

5 Claims. (Cl. 16—35)

This invention relates generally to a caster assembly having means for braking or locking both the wheel rotation and the swivel motion of the caster, and particularly to such an assembly wherein the wheel braking and swivel braking may be applied either simultaneously or alternately.

In casters of the type herein referred to, such as those used on stretcher carriers or the like in hospitals, it is often advantageous in positioning or maneuvering the caster supported apparatus to provide a braking means for selectively locking the caster wheel rotation and the swivel action of the caster in unison, and for locking the swivel action without locking the caster wheel rotation.

The present invention provides a caster assembly in which a readily accessible foot-operated lever or pedal actuates the wheel and swivel brakes in the manner referred to above.

This selective locking of the wheel rotation and swivel motion of the caster is accomplished by means of a simplified arrangement of parts which provides a rugged, trouble-free assembly.

The advantages provided by the present invention referred to above together with other attendant advantages will become apparent as the description proceeds with reference to the accompanying drawings in which:

Fig. 1 represents a side view partially in section and with portions broken away to more clearly show the co-action of the parts of the apparatus.

Fig. 2 is an end view of the apparatus shown in Fig. 1 with certain portions thereof illustrated in alternate positions by broken lines.

Fig. 3 is a top view of the assembly shown in Fig. 1.

Fig. 4 is a detail enlarged view of a portion of the apparatus shown in Fig. 1.

Fig. 5 is a detail enlarged view showing another portion of the apparatus of Fig. 1.

Fig. 6 is an enlarged view illustrating the assembly detail of the portions shown in Figs. 4 and 5.

Fig. 7 is a detailed, fragmentary view of an alternate form of one of the assembly components.

Referring initially to Figs. 1, 2 and 3, there is shown a caster assembly comprising a caster wheel 10 rotatably mounted on an axle 11 carried by members 12. At their upper ends the members are joined at 13 to form a conventional swivel bearing assembly 14 comprising stationary members 16 and 17. These are adapted to cooperate with movable members 18 and 19 which are rigidly secured to a swivel stem or shaft 21. At its inner end, the shaft 21 carries a swivel head member 22 having downwardly flanged margins with spaced notches or slots therein as shown at 23. The member 22 is tongued to positively engage with a milled slot in the caster stem 21 so as to rotate therewith and as shown carries four of the notches 23 whose number may be varied as desired. Annular thrust bearing members 26 and 27 support the swivel shaft 21 for rotation on stationary members 16 and 17.

Welded or secured by any other suitable means to the joined ends of the members 12 is a bracket 28 which, as may be seen in Figs. 1 and 2, forms a housing or a swivel caster wheel sub-assembly. Spanning the sides of the bracket 28 is a pivot pin 31 which, as may best be seen in Figs. 3, 4 and 6, accommodates spacers 47 and 48. Interposed therebetween are the upstanding ears 32 and 33 formed from a wheel brake member 34 which has its free end formed to provide a brake shoe 35 adapted to cooperate with the wheel 10. Adjacent a central bend in the member 34 is an elongated detent notch or depression 36.

Mounted adjacent the member 34 on the shaft 31 is a swivel stop member 38 which is generally U-shaped and carries intermediate its ends downwardly extending ears 39 and 40 which accommodate the pin 31. As may best be seen in Fig. 5, one free end of the member 38 carries an elongated detent groove or depression 41 and the other free end has a reduced portion 42 adapted to cooperate with the notches 23 in the member 22 as will be subsequently explained. The pin 31 further carries a torsion spring 44, one end of which reacts against the member 38 and the other end against the member 34. As may be seen in Fig. 6, the spring 44 tends to rotate the member 38 and the member 34 in the directions indicated. When assembled in the bracket 28 this spring tends to pivotally move the member 38 into swivel braking or locking position, with the reduced portion being urged against the inner face of the member 22, and being moved into one of its notches upon swivel displacement of the wheel. The nearest notch 23 will thus be brought into locking position opposite portion or tab 42. The spring 44 will further tend to pivotally move the wheel brake member 34 counterclockwise as viewed in Fig. 1 out of braking position with relation to the caster wheel 10.

The means for selectively operating the swivel brake and the caster wheel brake either alternately or simultaneously will now be described, this means comprising a lever or plate 51 rotatably mounted at 52 on the side face of the bracket 28. Extending from its inner face the plate 51 carries two angularly spaced abutments 53 and 54, one of which extends through an appropriate slot 56 in the bracket 28, and the other through an appropriate cutaway portion or slot at the base of the bracket 28. This plate further carries flanges 58 along its top which are adapted to permit foot operation of the plate.

With the parts in their solid line position of Figs. 1 and 2, it will be evident that the abutment 53 will be centered in the detent notch 41 carried by the member 38, and the abutment 54 will be displaced laterally from the member 34. As a result the wheel braking member 34 will have its shoe 35 held clear of wheel braking relation. The caster wheel 10 and the swivel brake member 38 will be displaced by the abutment 53 out of swivel braking engagement with the downturned flange on the member 22 and the notches 23 carried thereby. This displacement will be against the force exerted by the spring 44. Thus, in this position, the caster wheel 10 will be free to swivel and to rotate.

As shown in Fig. 7, the abutments 53 and 54 may be fashioned as at 54a so as to be adjustable, with the adjustment being fixed by jamb nut 50. Provision for this adjustable positioning of the abutments permits compensation for wear of the parts, particularly for wear of the caster wheel 10, also for varying the braking pressure as desired.

If the plate 51 is caused to assume its broken line position indicated by 61 in Fig. 2, it will be evident that the abutment 53 will ride out of the notch 41 carried by the member 38. It will ride off the side thereof permitting the spring 44 to move the member 38 into swivel locking position within the notch 23 formed therein when the notch is positioned opposite the end 42 of the member 38. With the plate 51 in the broken line position indicated by 61 in Fig. 2, it will be further apparent that the abutment 54 is brought into contact with the notch 36 carried by the wheel braking member 34. This results in the member 34 being moved against the force exerted by the torsion spring 44 into wheel braking position, with the brake shoe portion 35 of the member 34 pressed into contact with the caster wheel 10. Under these conditions, therefore, both the swivel motion of the caster assembly and the rotational motion of the caster wheel 10 will be locked.

If the plate 51 should now be moved to a further broken line position indicated at 63 in Fig. 2, it will be apparent that the abutment 53 will ride out of the notch 41 carried by the member 38 and off the side thereof releasing the member 38 to be moved pivotally inward by the torsion spring 44 with the reduced portion 42 of the member 38 engaging the downwardly extending flange on the member 22. It will be further guided into locking engagement with one of the notches 23 in the member 22 when the swivel shaft 21 is moved slightly to bring a notch 23 in alignment with the portion 42, thus locking the swivel motion of the caster assembly. With the plate 51 in its broken line position 63 of Fig. 2, it will be further evident that the abutment 54 will be held clear of the member 34 and spring 44 will, therefore, retain the wheel braking member 34 out of engagement with the caster wheel 10. Thus in this broken line position 63 of Fig. 2, the swivel motion of the caster assembly will be locked but the caster wheel 10 will be free to rotate.

The present invention thus provides a caster assembly which by a simplified arrangement of parts permits locking or braking of the swivel motion of the caster assembly without braking the caster wheel rotation or alternately the application of both swivel and caster wheel locking members simultaneously. Further, the arrangement of the locking members 34 and 38 subject to the force exerted by torsion spring 44 provides for automatic compensation for wheel wear of members 34 and 38.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a caster assembly, a caster wheel supported for rotation by a bifurcated member, a swivel shaft, bearing means disposed between the member and the shaft to permit swiveling of the caster wheel thereabout, means for selectively braking both rotation of the caster wheel and the swivel motion thereof comprising a pin spanning said bifurcated member and supported thereon parallel to the axis of rotation of the caster wheel, a swivel brake member and a wheel rotation brake member mounted on said pin for independent pivotal movement into and out of braking position, a member rotatable with said swivel shaft contacted by said swivel brake member when in braking position, said wheel rotation brake member contacting said caster wheel when in braking position, a single resilient element acting on both of said brake members to urge the swivel brake member into braking position and the wheel brake member out of braking position, and movable cam means carried by said bifurcated member selectively engageable with said brake members, whereby said swivel brake member is moved out of braking position by said cam means when engaged thereby and said wheel brake member is held out of braking position by said resilient element, said wheel brake member is moved into braking position by said cam means when engaged thereby and said swivel brake member is held in braking position by said resilient element, and when neither of said brake members is engaged by said cam means said resilient element holds said swivel brake member in braking position and said cam brake member out of braking position.

2. An assembly as claimed in claim 1 in which the movable cam means comprises a plate rotatably supported by said bifurcated member, said plate having spaced abutments thereon adapted to engage one, both or neither of said brake members depending on the rotative position of said plate.

3. An assembly claimed as in claim 1 in which the movable cam means comprises a plate rotatably supported by said bifurcated member, said plate having spaced abutments thereon positionally adjustable toward and away from said brake members, said abutments being adapted to engage one, both or neither of said braking members depending on the rotative position of said plate, the positional adjustment of said abutments permitting compensation for wear of said abutments, brake members and caster wheel.

4. An assembly as claimed in claim 1 in which the resilient element is a torsion spring encircling said pin and reacting at one of its ends against said swivel brake member and at its other end against said wheel brake member.

5. In a caster assembly, a caster wheel supported for rotation by a bifurcated member, a swivel shaft, bearing means disposed between the member and the shaft to permit swiveling of the caster wheel thereabout, a housing mounted on said bifurcated member, a pin spanning the interior of said housing, a wheel rotation brake arm and a swivel motion brake arm mounted for independent pivotal motion on said pin, a torsion spring encircling said pin and adapted to urge said arms in opposite directions thereabout, said wheel brake arm being thereby urged out of braking position and said swivel brake arm being thereby urged into braking position, a foot-operated camming member comprising a plate rotatably mounted exteriorly of the housing and having dual abutments thereon extending through appropriate openings in the housing and adapted to respectively engage said brake arms, said abutments clearing both of said brake arms when the camming member is in a first foot operated position to thereby permit said spring to move said swivel brake arm into braking position and said wheel brake arm out of braking position, said spring retaining said wheel brake arm out of braking position and one of said abutments displacing said swivel brake arm out of braking position when said camming member is in a second foot operated position to thereby dispose both of said brake arms out of braking position, the other of said abutments displacing said wheel brake arm into braking position and said one abutment freeing said swivel brake arm for movement into braking position by said spring when the camming member is in a third foot-operated position to thereby dispose both of said brake arms in braking position.

References Cited in the file of this patent

UNITED STATES PATENTS

| | | |
|---|---|---|
| 704,077 | McCauley | July 8, 1902 |
| 1,633,638 | Jarvis et al. | June 28, 1927 |
| 1,671,774 | McIntosh | May 29, 1928 |
| 2,188,648 | Bouvier | Jan. 30, 1940 |
| 2,482,961 | Bishop | Sept. 27, 1949 |
| 2,484,094 | Jackson | Oct. 11, 1949 |
| 2,709,828 | Noelting | June 7, 1955 |